(12) United States Patent
Farrugia et al.

(10) Patent No.: US 11,597,805 B2
(45) Date of Patent: Mar. 7, 2023

(54) METHOD FOR PRODUCING SULFONE POLYMER MICRO-PARTICLES FOR SLS 3D PRINTING

(71) Applicant: Xerox Corporation, Norwalk, CT (US)

(72) Inventors: Valerie M. Farrugia, Oakville (CA); Edward G. Zwartz, Mississauga (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 853 days.

(21) Appl. No.: 16/380,100

(22) Filed: Apr. 10, 2019

(65) Prior Publication Data

US 2020/0325284 A1 Oct. 15, 2020

(51) Int. Cl.
| | |
|---|---|
| B29B 13/00 | (2006.01) |
| C08J 3/14 | (2006.01) |
| B33Y 10/00 | (2015.01) |
| B33Y 70/00 | (2020.01) |
| B29C 64/153 | (2017.01) |
| C08J 3/11 | (2006.01) |
| B29K 81/00 | (2006.01) |

(52) U.S. Cl.
CPC .......... *C08J 3/14* (2013.01); *B29B 13/00* (2013.01); *B29C 64/153* (2017.08); *B33Y 10/00* (2014.12); *B33Y 70/00* (2014.12); *C08J 3/11* (2013.01); *B29B 2013/002* (2013.01); *B29K 2081/06* (2013.01); *C08J 2381/06* (2013.01)

(58) Field of Classification Search
CPC .. C08J 3/14; C08J 3/11; C08J 2381/06; B29B 13/00; B29B 2013/002

USPC .......................................................... 264/4.6
See application file for complete search history.

(56) References Cited

U.S. PATENT DOCUMENTS

| | | |
|---|---|---|
| 2017/0028632 A1 | 2/2017 | Cox et al. |
| 2017/0246805 A1 | 8/2017 | Boydston et al. |
| 2018/0273707 A1 | 9/2018 | Price |
| 2020/0102427 A1* | 4/2020 | Farrugia ............... B29C 64/153 |

FOREIGN PATENT DOCUMENTS

| | | |
|---|---|---|
| CN | 1055004815 A | 4/2016 |
| EP | 2287234 A1 | 2/2011 |

OTHER PUBLICATIONS

Extended EP Search Report for EP20166908.2, dated Aug. 6, 2020, 6 pages.
Office Action for CA 3,077,936, dated May 27, 2021, 3 pages.
Office Action for CA Application No. 3,077,936, dated Jan. 14, 2022, 3 pages.
Office Action for CA Application No. 3,077,936, dated Sep. 16, 2022, 3 pages.

* cited by examiner

Primary Examiner — Jeffrey M Wollschlager
Assistant Examiner — Xue H Liu

(57) ABSTRACT

A method for producing polysulfone micro-particles for 3D printing disclosed. For example, the method includes creating a mixture of polysulfone by dissolving polysulfone in an organic solvent, creating an aqueous solution of a polymeric stabilizer or a surfactant, adding the mixture of polysulfone to the aqueous solution to create a polysulfone solution, and processing the polysulfone solution to obtain polysulfone micro-particles having a desired particle size, a desired particle size distribution, and a desired shape.

18 Claims, 3 Drawing Sheets

METHOD FOR PRODUCING SULFONE POLYMER MICRO-PARTICLES FOR SLS 3D PRINTING

The present disclosure relates generally to materials for three-dimensional printing and, more particularly, to a method for producing sulfone polymer micro-particles for selective laser sintering (SLS) three-dimensional (3D) printing.

BACKGROUND

Selective laser sintering (SLS) is a powder bed-based additive manufacturing (AM) technique to produce complex three-dimensional parts. When a laser beam scans the powder, the powder melts due to the rising temperature and layer-by-layer the final part approaches full density and should result in properties of the bulk material (i.e., polymer). In theory, every thermoplastic polymer that can be transformed into a powder form can be processed via this technique. However, the reality is every new material behaves differently during melting, coalescence, and consolidation, and requires optimization of the SLS processing parameters. The bed temperature and laser energy input are chosen based on the "processing" window of the polymer's thermal profile as well as its energy absorption. Laser parameters also need to be optimized based on the powder's particle size and shape.

The availability of powder materials for SLS is limited, where about 95% of the materials market consists of polyamide-12 which is a crystalline nylon grade polymer. High glass transition flexible amorphous materials such polysulfone (PSU) are not available as printable powders. Unlike semi-crystalline polymer powders, amorphous polymer powder must be heated above the glass transition temperature, at which the polymer is in a much more viscous state than semi-crystalline polymers at similar temperatures. Semi-crystalline polymers are highly ordered molecules with sharp melting points (Tm). Unlike amorphous polymers, they do not gradually soften as the temperature increases, but instead remain hard until a given amount of heat is absorbed and then rapidly transform into a viscous liquid. When a semi-crystalline material is above the Tm, it has very low viscosity and will flow and overlap with other sintered layers with rapid cooling. Amorphous polymers on the other hand will gradually soften as the temperature is increased but are not as easy flowing as semi-crystalline materials. The flow and sintering rate of amorphous powders would be less and blending between sintered layers would be more hindered and highly porous.

SUMMARY

According to aspects illustrated herein, there are provided a method for producing polysulfone micro-particles for 3D printing. One disclosed feature of the embodiments is a method that comprises creating a mixture of polysulfone by dissolving polysulfone in an organic solvent, creating an aqueous solution of a polymeric stabilizer or a surfactant, adding the mixture of polysulfone to the aqueous solution to create a polysulfone solution, and processing the polysulfone solution to obtain polysulfone micro-particles having a desired particle size, a desired particle size distribution, and a desired shape.

Another disclosed feature of the embodiments is a method for method for 3D printing. In one embodiment, the method comprises dispensing a layer of polysulfone micro-particles formed from a nanoprecipitation process applied to a mixture of polysulfone, an organic solvent, deionized water, and a polymeric stabilizer, wherein the plurality of polysulfone particles has a particle size greater than 10 microns, has a particle size distribution between 40 microns to 100 microns, and has a spherical shape, leveling the layer of plurality of polysulfone micro-particles, printing a desired shape on the layer of polysulfone micro-particles via a selective laser sintering processes, and repeating the dispensing, the leveling, and the printing to form a three-dimensional object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
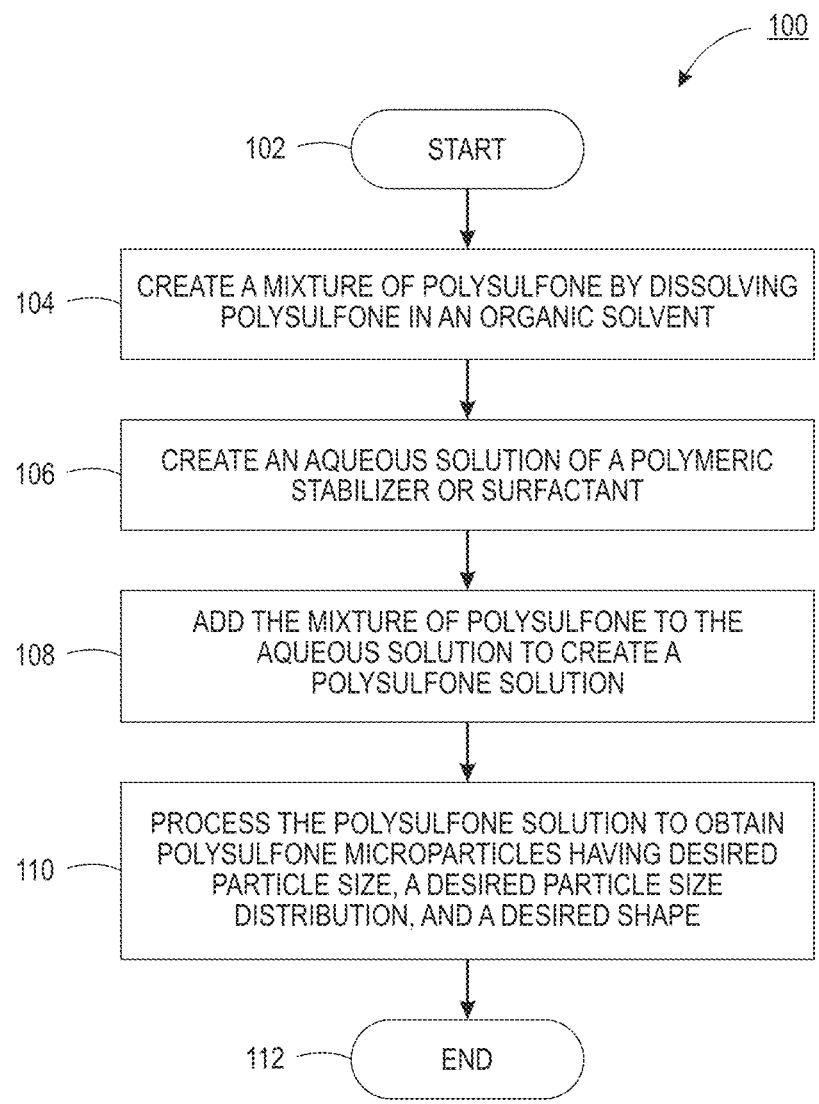
FIG. 1 illustrates a flowchart of an example method for producing polysulfone micro-particles for 3D printing of the present disclosure.

The present disclosure provides a method for producing sulfone polymer micro-particles for SLS 3D printing. As discussed above, it may be desirable to use amorphous polymers for SLS 3D printing. The amorphous polymers have properties that allow the flow and sintering rate of amorphous powders to be less than semi-crystalline polymers and blending between sintered layers may be more hindered and highly porous.

In one embodiment, a "polysulfone" may be any polymer containing a sulfonyl group. However, the term "polysulfone" is normally used for polyarylethersulfones (PAES), since only aromatic polysulfones are used in a technical context. Furthermore, since ether groups are always present in the industrially used polysulfones, PAES are also referred to as polyether sulfones (PES), poly(arylene sulfone)s, or simply polysulfone (PSU). The three terms (and abbreviations) may therefore be synonyms. As a term for all polysulfones, "poly(aryl ether sulfone)s (PAES)" is preferable because polysulfone (PSU), polyethersulfone (PES), and poly(arylene sulfone) (PAS) are additionally used as a name for individual polymers.

In one embodiment, polysulfone may be an excellent powder for making build material by the SLS process due to its excellent thermal and chemical resistance. Sulfone-based polymers such as polysulfone, polyethersulfone and polyarylsulfones have many positive attributes as seen in Table 1 below.

TABLE 1

GENERAL PROPERTIES AND STERILIZATION OF SULFONES

| General Properties | Good clarity (brownish tint) High stiffness & dimensional |
|---|---|

TABLE 1-continued

GENERAL PROPERTIES AND STERILIZATION OF SULFONES

| | |
|---|---|
| | stability |
| | High heat resistance |
| | Low shrink |
| | Chemical inertness and resistance |
| | Resistant to hot water and steam |
| | Good fire resistance |
| | Good bondability & joinability |
| | Universally sterilized |
| Sterilization | EtO-yes |
| | Gamma-yes |
| | Autoclave-yes |

Sulfone polymers, specifically polysulfone, are known in the micro-capsulation industry in many fields such as medicine, food, cosmetics, agriculture and textile. Polysulfone provides the mechanical, thermal, and chemical properties that can be advantageous for SLS 3D printing. The capsules are usually made by phase inversion by immersion precipitation using atomization as the means of introducing polymeric solution into the precipitation bath.

However, as noted above, flexible amorphous materials such as polysulfone are not available as a printable powders. There is some research in the area of processing polysulfone into powder by various techniques using the top-down approach. However, none of the currently existing processes form the polysulfone into the proper shape and size that can be used for SLS 3D printing and/or provide an efficient process that has a relatively low cost and low energy consumption.

Cryogenic or ambient temperature conventional ball milling often results in particles with an undesirable morphology and too-wide distribution. As well, long milling times result in discolored particles indicating polymeric degradation. These methods are not very green since they use a lot of energy and time, along with partially fractionated material leading to high amounts of waste or rework.

The rotor mill process to make powders requires a minimum of three pulverization steps, followed by sieving and a final refinement step. This process is also very energy and time consuming.

Spray drying requires two heat treatments of the polymer which are dissolution by reflux and the spraying process. Some of these particles are hollow as evident by collapsed structure while other particles have string-like artifacts around them as seen in scanning electron microscope (SEM) images. Like spray drying, other physicochemical methods like thermal-induced phase separation (TIPS), diffusion-induced phase separation (DIPS), and evaporation phase separation (EPS) tend to achieve spherical particles but require large amounts of non-solvents to induce the phase separation. Other issues with DIPS and TIPS is that the particle size of the powders is too small, from 1-3 microns, and agglomeration is also difficult to control.

Embodiments of the present disclosure provide a method or process that produces polysulfone into a powder form for SLS 3D printing applications. The methods disclosed herein may produce polysulfone micro-particles in a desired shape and size distribution using a relatively low cost and low energy consumption method.

In one embodiment, the present disclosure uses a hybrid-type method from both micro-precipitation and solvent evaporation. The source of untreated or unprocessed polysulfone may be purchased from available polysulfone manufacturers or producers.

The polysulfone may then be dissolved in a solvent such as methylene dichloride (DCM, or methylene chloride, or dichloromethane), N,N-dimethylformamide (DMF), N,N-dimethylacetamide (DMA) or tetrahydrofuran (THF) and added to a solution of 1-2-wt % polyvinyl alcohol (PVA) that is under high shear (rpm) by syringe, peristaltic pump, or very slow controlled pouring. The organic phase may be removed from the resulting particle slurry by gentle heating or by solvent evaporation. These polysulfone particles exhibit spherical morphology and the particle distribution can be easily controlled to be narrow or wide by addition rate of polysulfone to aqueous phase and rotations per minute (rpm) of aqueous PVA solution. A wider particle size distribution may be beneficial for SLS 3D printing applications to permit better packing of particles by filling the dead volume between larger particles with the smaller particles.

FIG. 1 illustrates an example flowchart of a method for producing sulfone polymer micro-particles for SLS 3D printing of the present disclosure. The method 100 begins at block 102. At block 104, the method 100 creates a mixture of polysulfone by dissolving polysulfone in an organic solvent. The polysulfone may be purchased from a third party vendor that produces polysulfone in pellet or sheet form that can be used in injection molding, thermoforming, extrusion, extrusion blow molding, and the like, but is not fabricated into a form that is used as fine powders for SLS 3D printing applications.

In one embodiment, the polysulfone may be dissolved in an organic solvent at ambient temperature. In one example, the organic solvent may be dichloromethane. However, other organic solvents such as dimethyl sulfoxide (DMSO), dimethyl acetamide (DMAc), N-methylpyrrolidone (NMP), in dimethyl ether (DME) with the addition of 24-65 wt. % tetrahydrofuran (THF) or N,N-dimethyl formamide (DMF), Cyrene (dihydrolevoglucosenone), water/toluene mixture, cyclopentanone, benzonitrile, tetramethylurea, gamma($\gamma$)-butyrolactone may also be used.

At block 106, the method 100 creates an aqueous solution of a polymeric stabilizer or surfactant. In one example, the aqueous solution may be formed with deionized water. The polymeric stabilizer or surfactant may be polyvinyl alcohol. Other examples of the polymeric stabilizer or surfactant may include poly(vinyl acetate), poly(methyl methacrylate), poly (acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly (vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, Tween™ 80, Tween™ 20, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer such as Soluplus®, polyvinyl acetate phthalate, cellulose acetate phthalate, or any combinations thereof.

At block 108, the method 100 adds the mixture of polysulfone to the aqueous solution to create a polysulfone solution. In one embodiment, the aqueous solution with the polymeric stabilizer or surfactant may be cooled before the solution of polysulfone and the organic solvent are added to the aqueous solution.

In one embodiment, the mixture of the polysulfone and the organic solvent may be added to the aqueous solution in a dropwise fashion. The aqueous solution may be stirred while the mixture of the polysulfone and the organic solvent is being added. After all of the mixture of the polysulfone and the organic solvent is added to the aqueous solution, the aqueous solution with the polymeric stabilizer, the polysulfone, and the organic solvent (e.g., the polysulfone solution) may be stirred overnight or for twenty four hours.

At block 110, the method 100 processes the polysulfone solution to obtain polysulfone micro-particles having a desired particle size, a desired particle size distribution, and a desired shape. In one embodiment, the processing may involve separating out the polysulfone micro-particles from the polysulfone solution. In one embodiment, the separation may include multiple steps to remove the organic solvent, the deionized water, and the polymeric stabilizer or surfactant. In one embodiment, the separation may involve a single or multiple step filtration process.

In one embodiment, the separation process may include heating the polysulfone solution to remove the organic solution via evaporation. For example, the polysulfone solution may be heated to a temperature that is associated with the boiling temperature of the organic solution.

Then, the remaining polysulfone solution without the organic solvent may be transferred to a centrifuge bottle and centrifuged to remove the polymeric stabilizer or surfactant and the deionized water. The remaining polysulfone particles may be re-suspended in deionized water and mixed before centrifuging again. The wash and centrifuge procedure may be repeated and the slurry of the polysulfone particles and deionized water may be frozen. The frozen slurry may then be subjected to a high vacuum that may remove the ice or frozen deionized water via a sublimation process. At block 112, the method 100 ends.

Figure 2:
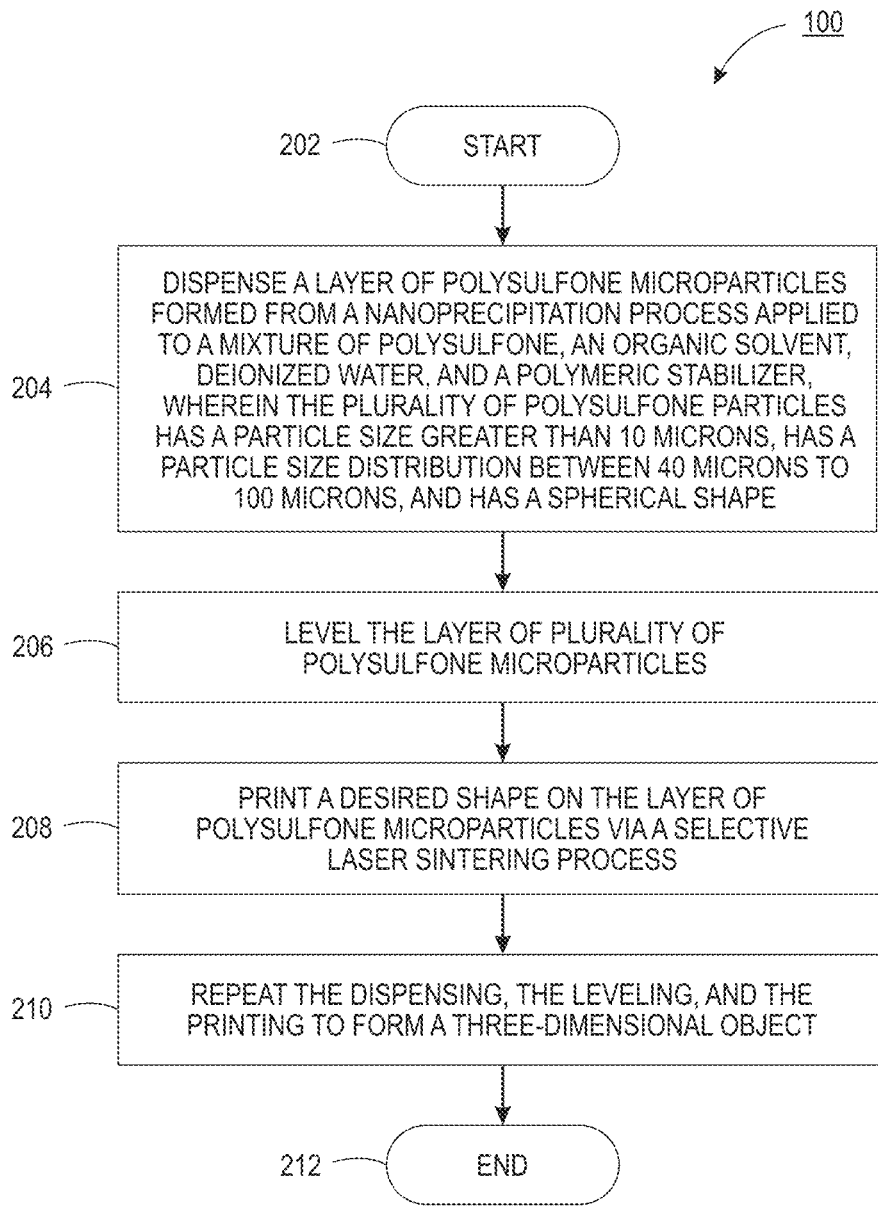
FIG. 2 illustrates a flowchart of an example method for 3D printing using the polysulfone micro-particles produced by the methods disclosed in the present disclosure.

FIG. 2 illustrates an example flowchart of a method for 3D printing using the polysulfone micro-particles produced by the methods disclosed in the present disclosure. The method 200 begins at block 202. At block 204, the method 200 dispenses a layer of polysulfone micro-particles formed from a nanoprecipitation process applied to a mixture of polysulfone, an organic solvent, deionized water, and a polymeric stabilizer, wherein the plurality of polysulfone particles has a particle size greater than 10 microns, has a particle size distribution between 40 microns to 100 microns, and has a spherical shape. The process to form the polysulfone micro-particles may be the same as described above in FIG. 1, or provided in the Example 1 discussed in further details below.

In one embodiment, the polysulfone micro-particles may be sieved through a screen and applied onto an aluminum plate. The screen may be, for example, approximately a 150 micron screen.

At block 206, the method 200 levels the layer of polysulfone micro-particles. In one embodiment, a 40 millimeter gap bar coater may be used to level the polysulfone micro-particles into an approximately 1 millimeter thick layer of powder.

At block 208, the method 200 prints a desired shape on the layer of polysulfone micro-particles via a selective laser sintering process. For example, the printing may be performed by an SLS 3D printer. In one example, the powder may be heated to approximately 180 degrees Celsius (° C.) and the printer may wait for approximately 1200 seconds to let the temperature stabilize. The laser rate may be varied between 30,000 to 40,000 and the laser power may be varied between 35% to 80%. The chamber and/or powder may be cooled before moving.

At block 210, the method 200 repeats the dispensing, the leveling, and the printing to form a three-dimensional object.

For example, the 3D object may be printed by printing one layer of the polysulfone micro-particles at a time.

It has been determined that a high laser power (e.g., 80%) combined with a slow laser rate (e.g., 30,000) provides a sintered part with the best results and smallest percentage of voids. At block 212, the method 200 ends.

Example 1 described below provides an example with processing parameters that were used to produce the polysulfone micro-particles described herein that are suitable for use as powders in an SLS 3D printer.

Example 1

Polyvinyl alcohol (PVA) (13.9 grams (g), Mowiol 4-98, molecular weight (Mwt)~27K) was dissolved in deionized water (DIW) at approximately 50° C. The weight of the DIW was 1148.2 g. The weight percent of PVA in DIQW was 1.21 wt %.

Meanwhile in a separate flask 37.6 g of polysulfone was dissolved in 758.6 g dichloromethane at ambient temperature. The aqueous PVA solution was cooled to 40° C. before starting the addition of polysulfone in DCM via syringe needle. The ratio of polysulfone to DCM was 1:20.

The rotations per minute (RPM) of the aqueous PVA solution was increased from 900 to 1300. As the PSU was adding to the aqueous PVA solution, the aqueous PVA solution turned opaque. The last 600 g of the polysulfone solution was slowly added by pouring since the syringe needle addition was too slow. After adding all the polysulfone solution over 35 minutes, the RPM was lowered to 600 RPM and an extra 303.9 g of DIW was added to the emulsion.

The vessel was then left to stir overnight partially covered with foil. The next day, the emulsion was heated to 37° C. to remove any residual dichloromethane. After the dichloromethane was evaporated, the solution was transferred to a 1 liter (L) centrifuge bottle and centrifuged at 3000 RPM for 15 minutes to remove the PVA/DIW mixture. The particles were re-suspended in DIW and mixed by shaking for about 30 seconds before centrifuging again at 3000 RPM for 15 minutes. This wash/centrifuge procedure was repeated one more time before concentrating particles and transferring to a freeze-drier bottle. The polysulfone particle slurry was rapidly frozen and then placed on a freeze drier which subjected the bottled particles to a high vacuum that removed ice by sublimation.

Figure 3:
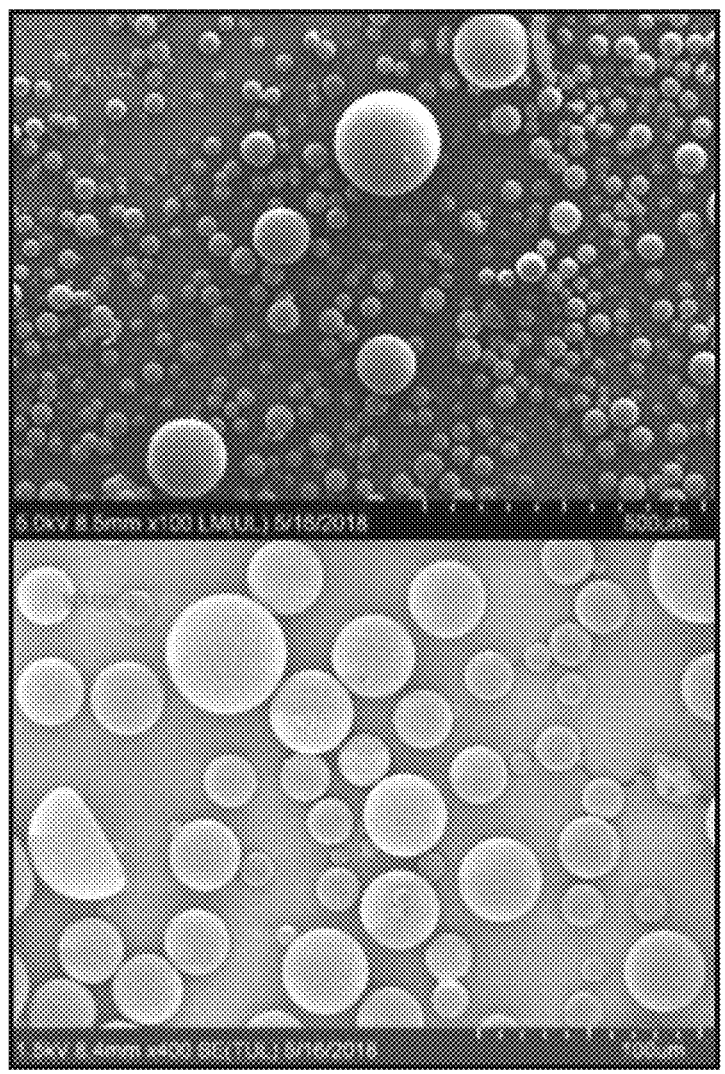
FIG. 3 illustrates an example of scanning electron microscope (SEM) images of the polysulfone micro-particles produced by the present disclosure.

FIG. 3 illustrates example SEM images of the resulting polysulfone micro-particles that are produced. The micro-particles have a spherical shape as can be seen by the SEM images. For example, the shape of the micro-particles may have a circularity that is approximately 1.0 (e.g., where circularity values range from 0 (not circular) to 1.0 (perfectly circular). The shape of the micro-particles may have a geometric standard deviation of 1.2 to 2.0.

In addition, resulting polysulfone micro-particles may each be greater than 10 microns. In another example, the average size of the resulting polysulfone micro-particles may be greater than 10 microns. In one embodiment, the resulting polysulfone micro-particles may have a particle size distribution that is between 40 microns to 100 microns. As can be seen in the SEM images, the smaller particles may help fill the voids between the larger particles. As a result, when the micro-particles are sintered, the sintered layer may have less voids in each layer during 3D printing.

In one embodiment, the size of the polysulfone particles may be controlled by a variety of different parameters. The parameters may include the stir rate, concentration of the reactants, a type of stabilizer that is used (e.g., a polymeric or surfactant), or a type of organic solvent that is used. As noted above, control of these parameters may allow the process described above to create polysulfone micro-particles of a desired shape, a desired particle size, and a desired particle size distribution to be used as a powder for SLS 3D printing applications.

In addition, although nothing has been added to the polysulfone in the processes described herein, the processed polysulfone shows differences in physical characteristics between the processed polysulfone micro-particles produced as described above versus unprocessed polysulfone particles. For example, thermogravimetric analysis (TGA) and differential scanning calorimetry (DSC) show some differences between unprocessed polysulfone and the processed sulfone, as described by the present disclosure.

The TGA monitors the mass of the polymer as a function of temperature and can quantify loss of water, loss of solvent, loss of plasticizer, loss of surfactant, weight % ash, etc. The TGA thermal event of the polysulfone particles has shown that there are three distinct thermal events taking place, while the unprocessed polysulfone pellets only showed two distinct thermal events. The processed polysulfone showed residual PVA in the 200 to 500° C. window of the curve, which gives an extra thermal event that did not show up in the "virgin" PSU. The residual PVA present within the PSU is very low and should not have any effect on the properties of the polysulfone particles when used as a 3-D building material. In many applications PVA is added to promote more resistant materials with higher tensile strength, high elongation at break and higher Young modulus.

Also, the same polysulfone material that has been processed into micro-particles showed a very different thermal behavior compared to the unprocessed polysulfone. A glass transition seemed to occur around 44° C., followed by a melting point around 224° C. during the first heat cycle. During cooling, a crystallization peak was observed at 206° C. The second heat cycle showed a possibility of two glass transition (Tg) events, one at 77° C., the other at 187° C., followed by a melting point at 225° C. Since the Tg of the second heat is similar to the unprocessed polysulfone, it confirmed that no degradation occurred during the particle making process. Since a melting point has appeared, it can be concluded that the particle formation has somehow imposed a change on the orientation of the polymer chains making the polymer semi crystalline in nature, e.g., a chain alignment has occurred.

Thus, the present disclosure provides an efficient process for making polysulfone micro-particles that can be used as a powder for SLS 3D printing. The process of the present disclosure may have lower costs due to lower energy consumption and processing times, while producing polysulfone micro-particles that have a desired shape, a desired particle size, and a desired particle size distribution.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for producing polysulfone micro-particles for three-dimensional (3D) printing, comprising:

creating a mixture of polysulfone by dissolving polysulfone in an organic solvent;
creating an aqueous solution of a polymeric stabilizer or a surfactant;
adding the mixture of polysulfone to the aqueous solution to create a polysulfone solution;
processing the polysulfone solution to obtain polysulfone micro-particles having a desired particle size, a desired particle size distribution, and a desired shape;
suspending the polysulfone micro-particles in deionized water to form a slurry of the polysulfone micro-particles and the deionized water; and
applying a centrifuge process to the slurry.

2. The method of claim 1, wherein the adding comprises: adding the mixture of polysulfone in a dropwise fashion.

3. The method of claim 1, wherein the aqueous solution is cooled before the mixture of polysulfone is added to the aqueous solution.

4. The method of claim 1, further comprising:
stirring the aqueous solution while the mixture of polysulfone is added.

5. The method of claim 1, further comprising:
stirring the polysulfone solution for twenty four hours before the processing.

6. The method of claim 1, wherein the processing comprises separating the polysulfone micro-particles from the polysulfone solution.

7. The method of claim 6, wherein the separating comprises performing a filtration to remove the polysulfone micro-particles.

8. The method of claim 6, wherein the separating comprises:
heating the polysulfone solution to remove the organic solvent via evaporation; and
removing water and the polymeric stabilizer from the polysulfone solution via a centrifuge process.

9. The method of claim 1, further comprising:
freezing the slurry; and
removing ice from the slurry that is frozen via a sublimation process.

10. The method of claim 1, wherein the organic solvent comprises dichloromethane.

11. The method of claim 1, wherein the polymeric stabilizer or the surfactant comprises at least one of: poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly (acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, hydroxypropylmethylcellulose, copovidone and polyvinylpyrrolidone, polyethyleneglycols (PEG), polymethacrylates, hypromellose acetate succinate, hypromellose phthalate, a polyvinyl caprolactam-polyvinyl acetate-polyethylene glycol graft copolymer, polyvinyl acetate phthalate, or cellulose acetate phthalate.

12. The method of claim 1, wherein the desired particle size and the desired particle size distribution is a function of a concentration of the polysulfone and the polymeric stabilizer or the surfactant.

13. The method of claim 1, wherein the desired particle size is greater than 10 microns.

14. The method of claim 1, wherein the desired particle size distribution comprises 40 microns to 100 microns.

15. The method of claim 1, wherein the desired shape comprises a sphere having a circularity of approximately 1.0 and a geometric standard deviation of 1.2 to 2.0.

16. A method for producing polysulfone micro-particles for three-dimensional (3D) printing, comprising:
- dissolving polyvinyl alcohol in deionized water at approximately 50 degrees Celsius (° C.);
- dissolving polysulfone in dichloromethane at ambient temperature;
- cooling the polyvinyl alcohol in deionized water to approximately 40° C.;
- adding the polysulfone that is dissolved in the dichloromethane in a dropwise fashion while the polyvinyl alcohol in deionized water is stirred at approximately 1300 rotations per minute (RPM);
- reducing a rate of stirring to approximately 600 RPM after all of the polysulfone that is dissolved in the dichloromethane is added to the polyvinyl alcohol in deionized water; and
- separating polysulfone micro-particles that are formed from the dichloromethane, the polyvinyl alcohol, and the deionized water.

17. The method of claim 16, wherein the separating comprises:
- heating the polysulfone that is dissolved in the dichloromethane and added to the polyvinyl alcohol in deionized water to approximately 37° C. to remove the dichloromethane via evaporation; and
- centrifuging a remaining solution of the polysulfone, the polyvinyl alcohol, and the deionized water at 3000 RPM to remove the polyvinyl alcohol and the deionized water to obtain the polysulfone micro-particles.

18. The method of claim 17, wherein the separating further comprises:
- mixing the polysulfone micro-particles in a solution of deionized water;
- shaking the solution to disperse the polysulfone micro-particles in the deionized water;
- centrifuging the solution at 3000 RPM;
- freezing the solution; and
- applying a vacuum to the solution that is frozen to remove ice via sublimation.

* * * * *